April 14, 1964 D. H. BOCK 3,129,284

APPARATUS FOR REPRODUCING AND TRANSMITTING TRANSIENT IMAGES OF A SUBJECT MOVABLE RELATIVE TO THE APPARATUS

Filed Jan. 8, 1962 3 Sheets-Sheet 1

INVENTOR.
DITMAR H. BOCK
BY
Popp and Sommer
ATTORNEYS

INVENTOR.
DITMAR H. BOCK
BY
Popp and Sommer
ATTORNEYS

April 14, 1964 D. H. BOCK 3,129,284

APPARATUS FOR REPRODUCING AND TRANSMITTING TRANSIENT IMAGES OF A SUBJECT MOVABLE RELATIVE TO THE APPARATUS

Filed Jan. 8, 1962 3 Sheets-Sheet 3

INVENTOR.
DITMAR H. BOCK
BY
Popp and Sommer
ATTORNEYS

United States Patent Office 3,129,284

Patented Apr. 14, 1964

3,129,284

APPARATUS FOR REPRODUCING AND TRANSMITTING TRANSIENT IMAGES OF A SUBJECT MOVABLE RELATIVE TO THE APPARATUS

Ditmar H. Bock, Cheektowaga, N.Y., assignor to Cornell Aeronautical Laboratory, Inc., Buffalo, N.Y., a corporation of New York Filed Jan. 8, 1962, Ser. No. 165,468
1 Claim. (Cl. 178—7.2)

This invention relates to apparatus for reproducing and transmitting transient images of a subject movable relative to the apparatus, and more particularly to apparatus which may be carried by an aircraft or satellite capable of televising an image of the surface over which the aircraft or satellite is moving.

When pictures of a stationary object such as the surface of the earth are taken from a moving vehicle such as an aircraft or satellite, it is customary to use image motion compensation. The light sensitive film in the case of photography, or the light sensitive surface of a television camera tube where a television picture is desired, are moved in the image plane at a rate which is equal to the rate of motion of the image, and in the same direction. Thus, a point on the subject will always be focused on the same point of the light sensitive material. When the point moves out of the field of view, the corresponding image point is drawn behind a vignetting stop. When photographic roll film is used in a camera including image motion compensation, a quasi-continuous process takes place, with film moving from a supply reel, past an aperture and into a take-up reel. However, when an ordinary television camera tube is used as the light sensitive device, the technique of image compensation cannot be continuous since the entire photosensitive surface will eventually be drawn behind the vignetting stop. The camera tube must then be placed behind the aperture again.

It is accordingly the primary object of the present invention to provide apparatus for reproducing and transmitting transient images of a subject movable relative to the apparatus which is continuous in operation, i.e. televising that does not require periodic resetting of the television camera tube.

Other objects and advantages of the invention will be apparent from the following detailed description of two embodiments thereof and the accompanying drawings illustrating the same and wherein.

Figures 1, 2:
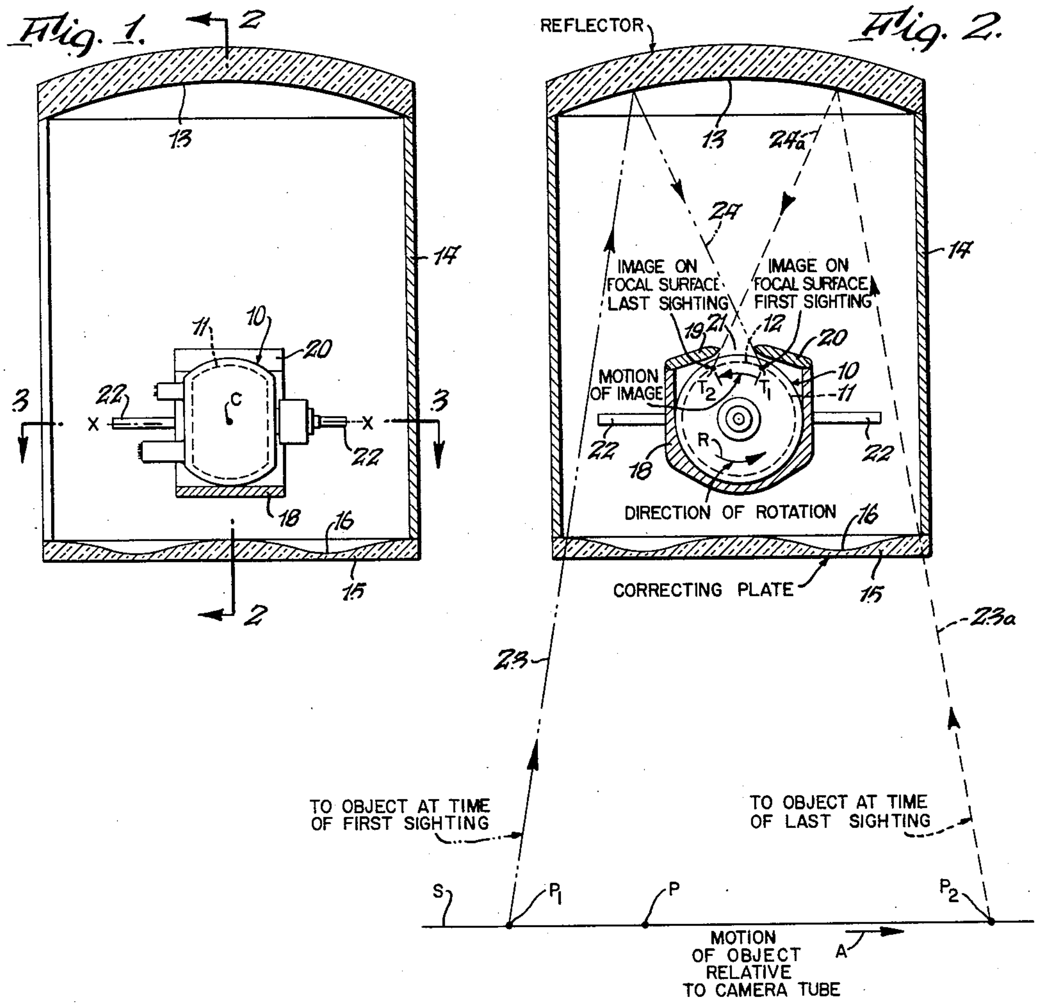
FIG. 1 is a vertical central sectional view through apparatus constructed in accordance with the present invention.
FIG. 2 is a vertical sectional view thereof taken generally on line 2—2 of FIG. 1.
Figure 3:
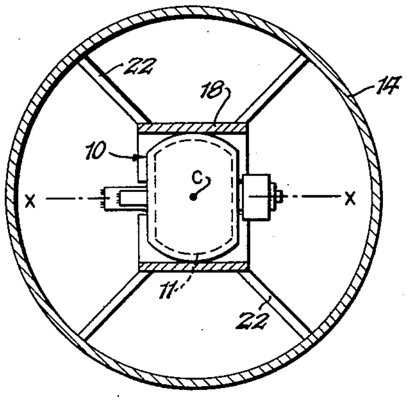
FIG. 3 is a horizontal sectional view thereof taken generally on line 3—3 of FIG. 1.
Figure 4:
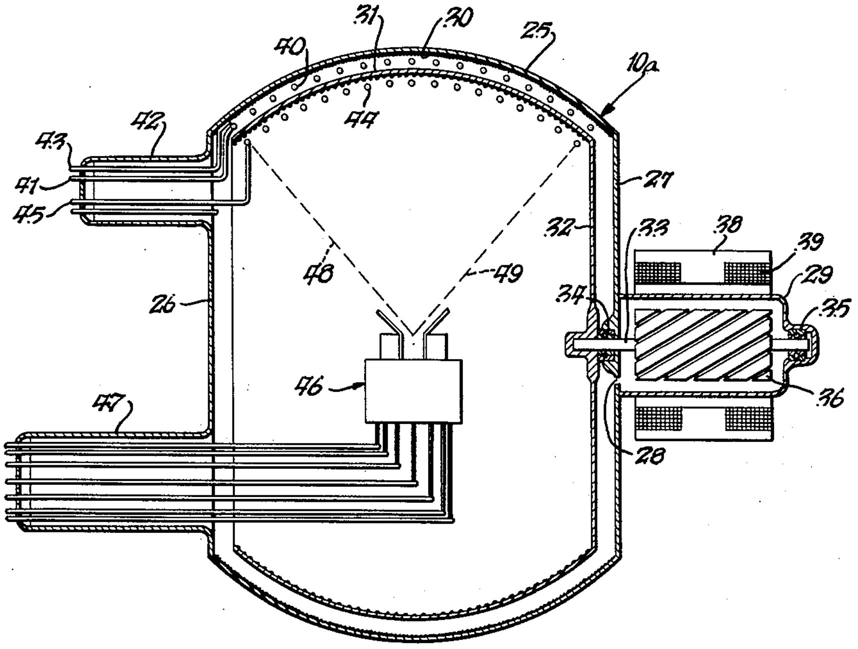
FIG. 4 is an enlarged central sectional view of an orthicon type television camera tube useful in the apparatus as shown in FIGS. 1–3.
Figure 5:
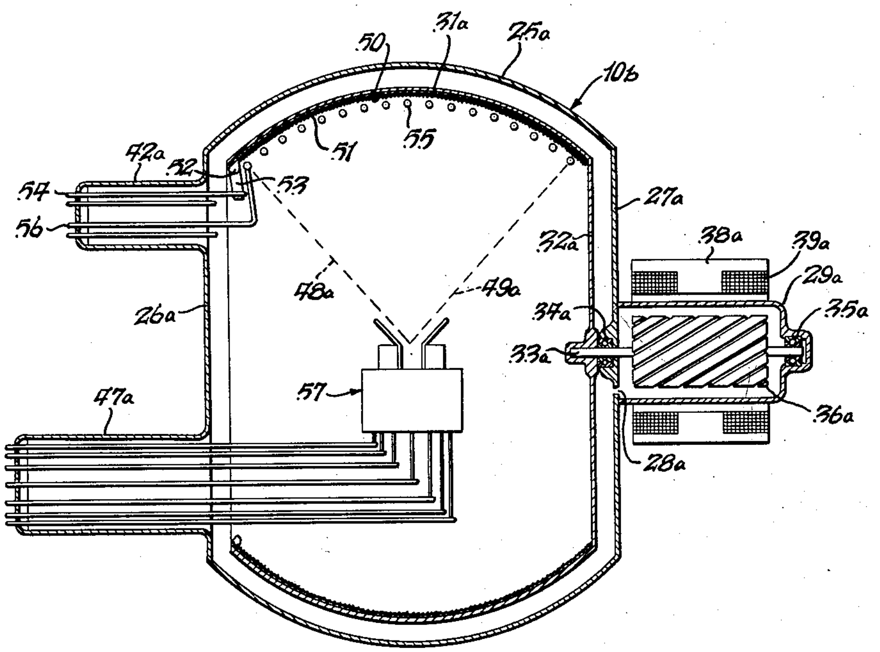
FIG. 5 is an enlarged central sectional view of a vidicon type television camera tube also useful in the apparatus illustrated in FIGS. 1–3.

The apparatus forming the subject of the present invention includes a television camera tube indicated generally at 10 in FIGS. 1–4 and which may be either of the orthicon type 10*a* illustrated in greater detail in FIG. 4 or the vidicon type 10*b* shown in FIG. 5. These individual types of tubes will be described in detail later herein. However, for present purposes, the tube 10 shown in FIGS. 1–3 is illustrated as having a photosensitive surface of revolution 11 generated about a horizontal axis X—X or a point lying on such axis. Specifically, such photosensitive surface 11 is spherical in form and is generated about the point C shown in FIGS. 1 and 3 which lies on the axis X—X.

The upper portion 12 of the photosensitive surface 11 is shown as being arranged in the spherical focal plane of a Schmidt optical system. This system comprises a downwardly facing spherical concave specular surface or reflector 13 which is circular in outline and suitably supported at its margin on the upper end of a tubular housing 14 vertically arranged. The lower end of this housing is shown as closed by a transparent correcting plate 15 having a flat horizontal lower surface and an annular groove 16 in its upper surface. As is well known to those skilled in the art, the function of the correcting plate 15 is to eliminate spherical aberration.

The television camera tube 10 is shown as arranged within the housing 14 intermediate the plate 15 and reflector 13 and is supported on a U-shaped saddle member 18 which embraces the lower part of the tube. Vignetting stop members 19 and 20 are suitably connected to the upper ends of the upright side portions of the U-shaped support member 18 and partially cover the upper portion of the tube 10. The space between the parallel and opposing edges of the members 19 and 20, and which are parallel to the axis X—X, provide an aperture or window 21 which extends the full width of the photosensitive surface 11 in the direction of the axis X—X. Thus the members 19 and 20 limit the field of view in a direction extending transversely of the axis X—X.

The support member 18 is shown as mounted centrally of the tubular housing 14 in a radial direction as shown in FIG. 3 by a plurality of arms 22 which extend generally radially of the housing, opposite ends of these arms being suitably fastened to such housing and to the member 18.

Referring to FIG. 2, let it be assumed that the apparatus described is carried by a vehicle, such as an aircraft or satellite, which is moving in vertically spaced relation over the surface S of the earth or other object. The height of the apparatus over surface S will be considerably greater, of course, than that depicted in FIG. 2. The direction of actual movement of the apparatus is from left to right as viewed in FIG. 2 so that a stationary point P on the surface S moves from position $P_1$ to position $P_2$ or relative to the apparatus in the direction of the arrow A. A beam of light 23 reflected from the point $P_1$ will pass through the correcting plate 15 and impinge upon the specular surface 13 from which it will reflect as beam 24, just passing the vignetting stop 20 through the window 21 into incidence with the photosensitive surface 11 at point $T_1$. It will also be seen that when said point P is in position $P_2$, the incident beam of light 23*a* reflecting therefrom passes upwardly through the correcting plate 15, impinges against the specular surface 13 and is reflected therefrom as beam 24*a* just past vignetting stop 19 through the window 21 into incidence with the photosensitive surface 11 at point $T_2$.

The photosensitive surface 11 is rotating in a counterclockwise direction as viewed in FIG. 2 and there represented by the arrow R so that a point on this surface at position $T_1$ will move to position $T_2$ during the same increment of time that it takes the point P on the surface S to move from position $P_1$ to position $P_2$. Thus, the photosensitive surface 11 is rotated about the axis X—X at a rate equal to the rate of motion of the subject's image in the spherical focal plane of the Schmidt optical system. Also, the top portion 12 of the photosensitive surface 11 upon which the moving image is focused, is moved in the same direction as that in which the image is moving, i.e. from right to left as viewed in FIG. 2. It will be observed that the axis of rotation X—X of the photosensitive surface 11 is perpendicular to the direction of relative movement of the apparatus and subject, as represented by the arrow A in FIG. 2.

The means for rotating the photosensitive surface 11 will be disclosed during the ensuing detailed descriptions of the television camera tubes shown in FIGS. 4 and 5.

FIG. 4 shows an orthicon type television camera tube 10*a* which may be used as the television camera tube 10 shown in FIGS. 1–3. Referring to FIG. 4, the tube 10*a* is shown as comprising an evacuated glass envelope including a truncated spherical portion 25, integral spaced side wall portions 26 and 27, the side wall portion 27 having an opening 28 therein covered by a cup-shaped glass enclosure 29 the rim of which is suitably bonded to the side wall portion 27. The inner surface of the spherical portion 25 is coated with a suitable photosensitive material 30 to provide a photocathode. Arranged within the glass envelope is a thin glass target 31 which is also of truncated spherical form, the target 31 being uniformly spaced from the surface 30.

Means are provided for rotatively supporting the target 31 within the glass envelope 25. Such means are shown as including a disc-shaped wall 32 at one end of the target 31 and suitably joined thereto. Centrally this wall 32 is suitably fastened to one end of a horizontal shaft 33 which is journalled on an inner anti-friction bearing 34 carried by the end wall portion 27 and at its opposite end on an outer anti-friction bearing 35 mounted on the outer end wall of the cup-shaped enclosure 29. It will be seen that rotation of the shaft 33, the axis of which corresponds to the axis X—X in FIGS. 1 and 3, will cause the target 31 to maintain its predetermined spaced relationship to the surrounding envelope surface 30. Electric motor means are provided for this purpose which include an armature 36 fast to the shaft 33 and arranged interiorly of the envelope extension 29. Arranged externally of this envelope extension 29 are the field means of the motor and which comprise a field core 38 and a field winding 39.

Arranged intermediate the photocathode 30 and target 31 is a stationary secondary electron collector grid 40 having a lead wire 41 which extends outwardly through the end of an integral envelope extension 42 formed on the envelope side wall 26. Also through this extension end passes the lead wire 43 for the coating of photosensitive material 30. Arranged inwardly of the target 31 and in spaced relation thereto is a stationary decelerator grid 44 having a lead 45 which extends outwardly through the end of extension 42. The various lead wires 41, 43 and 45 are suitably sealed to the end of the envelope extension 42.

Fixedly arranged generally centrally of the television camera tube 10*a* is an electron gun and multiplier indicated generally at 46 and having various lead wires which pass out of the glass envelope through the end wall of another tubular extension 47 and are suitably sealed. The electron gun is adapted to discharge an electron beam movable through the arc represented by the intersecting lines 48 and 49, suitably deflecting means being provided to effect this, all as well understood by those skilled in the art.

From the light image focused through the window 21 onto the exposed portion of the photocathode, an electron image is derived from the photosensitive material 30 that is accelerated to and electrostatically focused in the spherical surface of the target 31. These primary electrons strike the target which is relatively thin and cause the emission of secondary electrons that are collected by adjacent grid 40 which is held at a small positive potential with respect to target-voltage cutoff. The outer or photocathode side of the target 31 thus has a pattern of positive charges that corresponds to the light pattern from the scene being televised. Since the glass target 31 is very thin, the charges set up a similar potential pattern on the opposite or scanned side of the target 31.

The scanning action of the camera 10*a* causes the target to be scanned by an electron beam produced by the electron gun forming part of the mechanism indicated at 46. The beam is focused at the target and the decelerator grid 44 assures that the beam approaches normal or radial to the spherical surface of the target and is at a low velocity. If the elemental area on the target is positive, then electrons from the scanning beam deposit until the charge is neutralized. If the elemental area is at cathode potential, which corresponds to a black picture area, no electrons are deposited. In both cases, the electron beams are turned back and focused into the signal multiplier also forming part of the mechanism indicated at 46.

Turning now to a detailed consideration of the vidicon type television tube shown in FIG. 5, this tube, like that shown in FIG. 4, comprises a glass envelope having a truncated spherical wall portion 25*a*, an end wall portion 26*a* including tubular extensions 42*a* and 47*a*, and another end wall portion 27*a* having an opening 28*a* therein communicating with a tubular extension 29*a* which houses an armature 36*a*. The armature 36*a* is mounted on a shaft 33*a* journalled on bearings 34*a* and 35*a* and cooperates with field means arranged exteriorly of the extension 29*a* and including a field core 38*a* and a field winding 39*a*. The inner end of the shaft 33*a* is suitably fastened to the center of a disc 32*a* to the margin of which is connected a transparent member 31*a* of truncated spherical shape and arranged in uniformly spaced relation to the surrounding portion 25*a* of the glass envelope.

The internal surface of the member 31*a* has a transparent conducting film 50 thereon covered by a thin layer 51 of photoconductive material. This layer 51 is conductively connected to an annular slip ring 52 arranged adjacent the open end of the member 31*a* and moves therewith. This ring 52 is engaged by a stationary brush 53 electrically connected to a lead wire 54 which extends through the tubular extension 42*a* of the glass envelope.

Arranged inwardly of the transparent signal electrode 31*a*, 50, 51 is a stationary fine mesh screen or grid 55 which is connected to the lead wire 56 which extends out through the tubular extension 42*a*. Fixedly arranged generally centrally of the camera tube is an electron gun indicated generally at 57 which has lead wires which extend outwardly through the extension 47*a* of the glass envelope. The electron gun 57 is capable of discharging an electron beam deflectible through the angle represented by the lines 48*a* and 49*a*.

Each elemental area of the photoconductor 51 can be considered like a leaky capacitor with one plate electrically connected to the signal electrode via the lead wire 54, brush 53 and slip ring 52 that is at some possible voltage with respect to the thermionic cathode of the electron gun, and the other plate floating except when commutated by the electron beam. Initially, the gun side of the photoconductive surface 51 is charged to cathode potential by the electron gun 57, thus leaving a charge on each elemental capacitor. During the frame time, these capacitors discharge in accordance with the value of their leakage resistance, which is determined by the amount of light falling on that elemental area. Hence, there appears on the gun side of the photoconductive surface 51 a positive-potential pattern corresponding to the pattern of light from the scene or subject imaged on the opposite surface of the layer.

The electron beam is caused to scan the surface of the photoconductive layer 51 in the well-known manner, the grid 55 assuring that the electron beam approaches the surface normally and at a low velocity. When the beam scans the surface, it deposits electrons where the potential of the elemental area is more positive than that of the electron gun cathode and at this moment the electrical circuit is completed through the signal-electrode circuit to ground. The amount of signal current flowing at this moment depends upon the amount of discharge in the elemental capacitor, which in turn depends upon the amount of light falling upon this area.

In this case of either the orthicon tube 10a (FIG. 4) or the vidicon tube 10b (FIG. 5), the elements 31 and 31a shown in these tubes respectively are rotated by their respective motor means at a speed corresponding to the motion of the image of the subject being viewed so that every point on this subject, assuming it to be stationary relative to other points, remains in focus.

Also, the photosensitive surfaces of the respective orthicon and vidicon tubes are scanned adjacent the window or aperture 21 in the apparatus. Thus, after a given point on the rotating spherical surface 11, 31 or 31a has passed across the plane of the image, this point is drawn behind the stop 19 and scanned to provide a video output corresponding to the picture information at the original point. The scanning is done along a great circle of the truncated sphere and this great circle contains the axis of rotation X—X. Perpendicular incidence of the scanning beam is assured by deflection of the beam at the axis of rotation X—X by known means included in the mechanisms represented at 46 and 57 in FIGS. 4 and 5, respectively. The scan is a line scan since an additional deflection is provided by the rotation of the truncated sphere such as the surface 11, 31 or 31a.

It will be seen that the apparatus of the invention may employ any of the photosensitive surfaces utilized in television camera tubes. The use of an image orthicon photocathode and target is particularly advantageous when long exposures are desired because of low subject brightness such as in night reconnaissance. A vidicon photo resistive surface will prove advantageous when high resolution is desired under conditions of high illumination.

It will also be understood that if some defocusing can be tolerated, any convenient optical system may be employed instead of the Schmidt optical system illustrated.

From the foregoing, it will be seen that the present invention provides apparatus including an image motion compensated television camera tube which is capable of continuously televising a stationary subject while the apparatus is moving relative to such subject. The embodiments shown and described are intended as illustrative and not limitative of the invention the scope of which is to be measured by the appended claim.

What is claimed is:

In apparatus for reproducing and transmitting transient images of a subject movable relative to said apparatus, the combination comprising a Schmidt optical system including a spherical concave specular surface, a continuous spherical convex photosensitive surface rotatable about an axis containing the center of generation of said photosensitive surface and which axis is arranged perpendicular to the direction of relative movement of the apparatus and subject, said photosensitive surface having a portion opposing said specular surface and arranged at the spherical focal plane of said system, vignetting stop means adjacent said photosensitive surface to provide a window exposing a portion of said photosensitive surface upon which an image of said subject is focused through said window, means for rotating said photosensitive surface about said axis at a rate equal to the rate of motion of said image to move successive portions of said photosensitive surface past said window, said window having first and last sight edges spaced from each other circumferentially in the direction of such rotation, and means for scanning said photosensitive surface after it passes said last sight edge of said window to produce a video output.

References Cited in the file of this patent

UNITED STATES PATENTS

| | | |
|---|---|---|
| 2,330,682 | Clothier | Sept. 28, 1943 |
| 2,425,956 | Salinger | Aug. 19, 1947 |